AUTOMATIC DIAL CIRCUIT

Filed Feb. 9, 1968 3 Sheets-Sheet 1

*INVENTOR*
D. LEYBURN
AGENTS
Curphey & Erickson

INVENTOR
D. LEYBURN
AGENTS
Curphey & Erickson

May 5, 1970 D. LEYBURN 3,510,602

AUTOMATIC DIAL CIRCUIT

Filed Feb. 9, 1968 3 Sheets-Sheet 3

INVENTOR
D. LEYBURN
AGENTS
Curphey & Erickson

United States Patent Office

3,510,602

Patented May 5, 1970

3,510,602
AUTOMATIC DIAL CIRCUIT

Derek Leyburn, St. Laurent, Quebec, Canada, assignor to The Bell Telephone Co. of Canada, Montreal, Quebec, Canada

Filed Feb. 9, 1968, Ser. No. 704,419
Int. Cl. H04m *1/26*
U.S. Cl. 179—90 6 Claims

ABSTRACT OF THE DISCLOSURE

The dial circuit comprises a timing circuit which generates a series of timing pulses, a flip-flop circuit responsive to the timing circuit and digit counting relays responsive to the flip-flop circuit for counting the digits transmitted. A circuit interconnecting selected contacts of said counting relays and the multifrequency tone generator causes the generation of the required tones for each digit of the called number.

This invention relates to automatic dial circuits and more particularly to a circuit to generate tone pulses to make an automatically network switched connection to a distant telephone number.

With present telephone systems, the traditional manual dialing arrangements remain by far the most common means of signalling distant telephone numbers. However, the desire to constantly improve the telephone system has led to a new method of signalling with multifrequency tones which is faster than the traditional dialing method. One such method is described in U.S. Pat. 3,184,554 issued to L. A. Meacham et al.

Along with the improvement and modernization of the telephone plant came the desire for still faster and more accurate dialing with a minimum of memory requirement on the part of the subscriber. Instances where the need for an improved service is apparent appear where a group of members are frequently and repeatedly called.

The prior art contains various dial circuits for transmitting automatically the signals required for setting up a call through a switching network. One such system using multifrequency signalling is disclosed in U.S. Pat. 3,301,967 issued Jan. 31, 1967. Such system, however, is very complicated and furthermore, is designed for use in subscriber's premises only and cannot be used in central offices.

The circuit, in accordance with the present invention, is activated upon seizure of either a subscriber's loop, or a preceding trunk circuit. It is simple, inexpensive, and may be used in either the subscriber's premises or in the central office. It comprises a timing circuit which generates a series of timing pulses, a flip-flop circuit responsive to the timing circuit and digit counting relays responsive to the flip-flop circuit for counting the digits transmitted. A circuit interconnecting selected contacts of said counting relays and the multifrequency tone generator causes the generation of the required tones for each digit of the called number.

The automatic dial circuit is capable of dialing called numbers having a variable number of digits. A circuit including selected contacts of the digit counting relays operates a relay which connects the calling and called parties as soon as the last digit of the called number has been dialed.

The invention will now be described with reference to the accompanying drawings in which.

Figure 1:
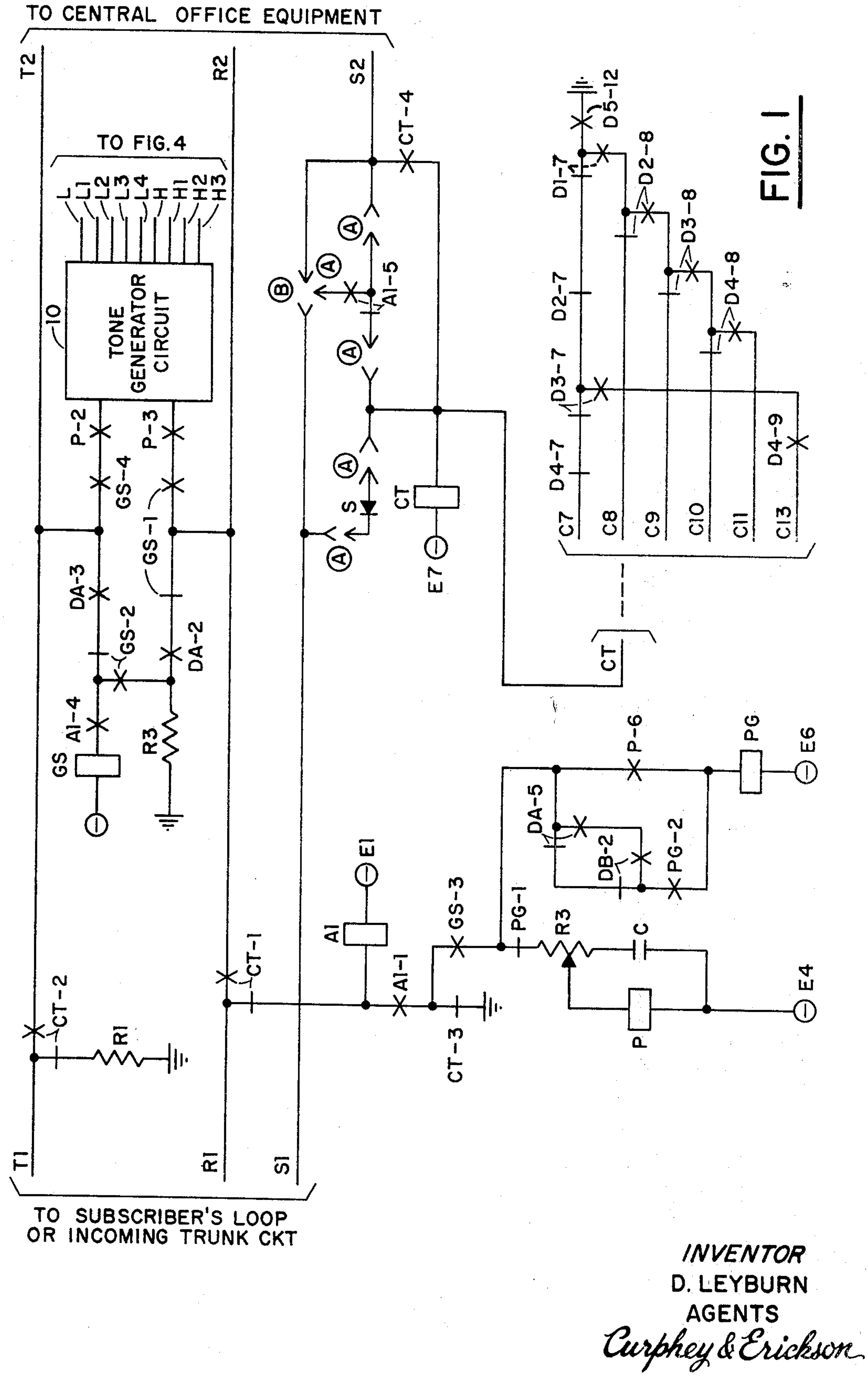
FIG. 1 illustrates the timing circuit and a portion of the dial circuit.
Figure 2:
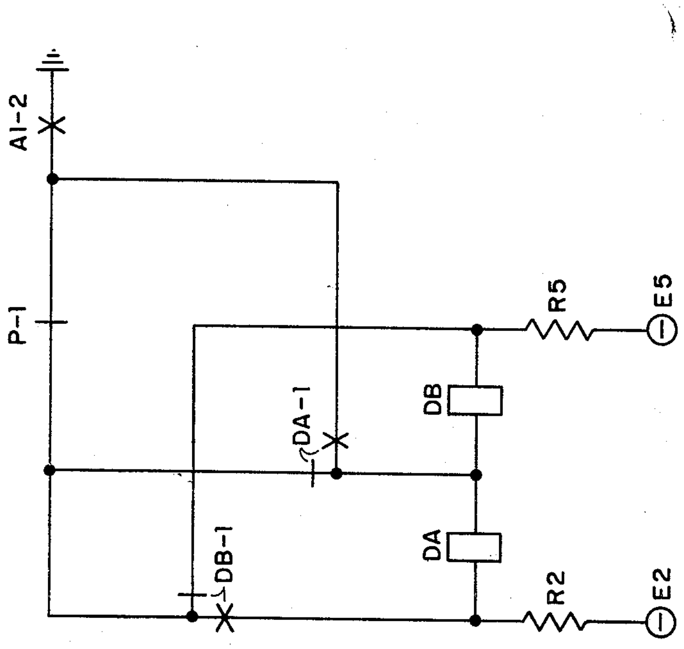
FIG. 2 illustrates the flip-flop circuit.

Referring to FIG. 1, a loop seizure on the T1–R1 input operates relay A1 through a circuit comprising potential source E1, relay A1, contacts CT–1, loop T1–R1, contacts CT–2, resistor R1 and ground. Relay A1 locks operated through its own contacts A1–1 and released contacts CT–3. The operaiton of relay A1 operates contacts A1–2 and energizes relay DA in FIG. 2 through the circuit comprising potential source E2, resistor R2, relay DA, contacts DA–1, contacts P–1, operated contacts A1–2 and ground. Relay DA locks to ground through its own contacts DA–1 and operated contacts A1–2. Relay DB does not operate at this time since it is shunted by contacts DB–1. The operation of relay A1 also closes contacts A1–3 in FIG. 3 to prepare a hold ground for the digit counting relays D1–D5 to be described later.

The operation of relay DA closes contacts DA–2 in FIG. 1 and supplies a ground start signal on conductor R2 to the central office equipment through released contacts GS–1. When the central office equipment is connected, a ground is returned on the T2 conductor as it is well known in the art. Ground on the T2 conductor operates relay GS through operated contacts A1–4 and DA–3 and released contacts GS–2. Relay GS locks operated through its own contacts GS–2 under the control of contacts A1–4 of relay A1.

Figure 3:
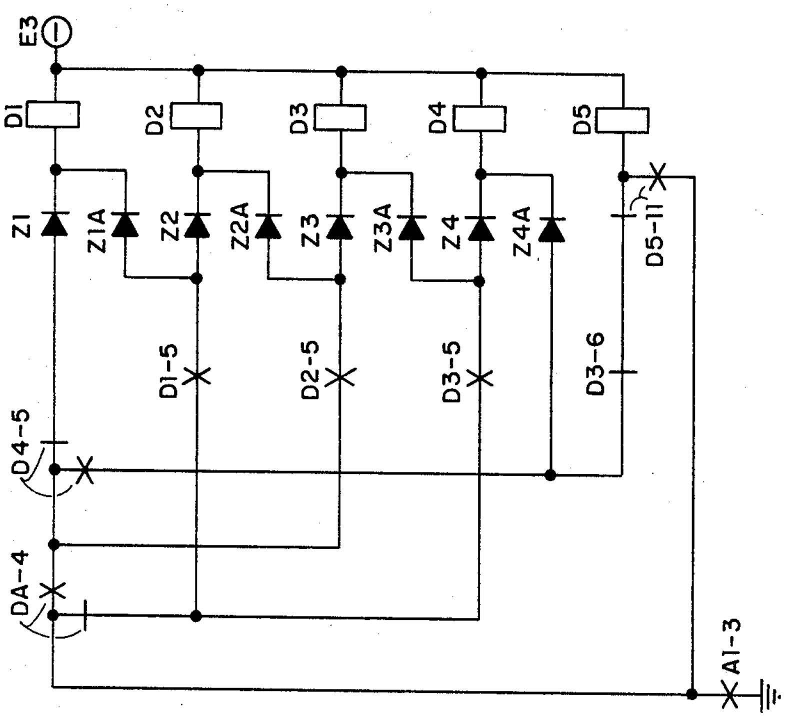
FIG. 3 illustrates the digit counting relays.

The operation of relay DA also closes contacts DA–4 in FIG. 3 and operates relay D1 of the digit counting relays through the circuit comprising potential source E3, relay D1, diode Z1, released contacts D4–5, operated contacts DA–4 and A1–3, and ground in preparation for the transmission of the first digit.

The operation of relay GS closes contacts GS–3 and operates relay P through the circuit comprising potential source E4, relay P, resistor R3, contacts PG–1, operated contacts GS–3, contacts CT–3 and ground. The operation of relay P opens contacts P–1 and removes the shunt around relay DB to energize relay DB through the circuit comprising potential source E5, resistor R5, relay DB, operated contacts DA–1 and A1–2, and ground. The operation of relay P, combined with the operation of relay GS, also extends the T2 and R2 conductors to the tone generator circuit 10 through contacts P–2, P–3, GS–1 and GS–4.

The multifrequency signalling system used in the preferred embodiment of the invention generates a different pair of tones for each digit to be transmitted. The tone generator circuit for such a system is known in the art and a description thereof may be found for example in U.S. Pat. No. 3,184,554 issued to L. A. Meacham et al. For each digit transmitted, one tone is selected from a low group of four frequencies L1 to L4 and one from a high group of three frequencies H1 to H3. The nominal signalling frequencies for each digit are:

| Digit | Code | Frequency combination (c.p.s.) |
|---|---|---|
| 1 | L1+H1 | 697+1, 209 |
| 2 | L1+H2 | 697+1, 336 |
| 3 | L1+H3 | 697+1, 477 |
| 4 | L2+H1 | 770+1, 209 |
| 5 | L2+H2 | 770+1, 336 |
| 6 | L2+H3 | 770+1, 477 |
| 7 | L3+H1 | 852+1, 209 |
| 8 | L3+H2 | 852+1, 336 |
| 9 | L3+H3 | 852+1, 477 |
| 10 | L4+H2 | 941+1, 336 |

Figure 4:
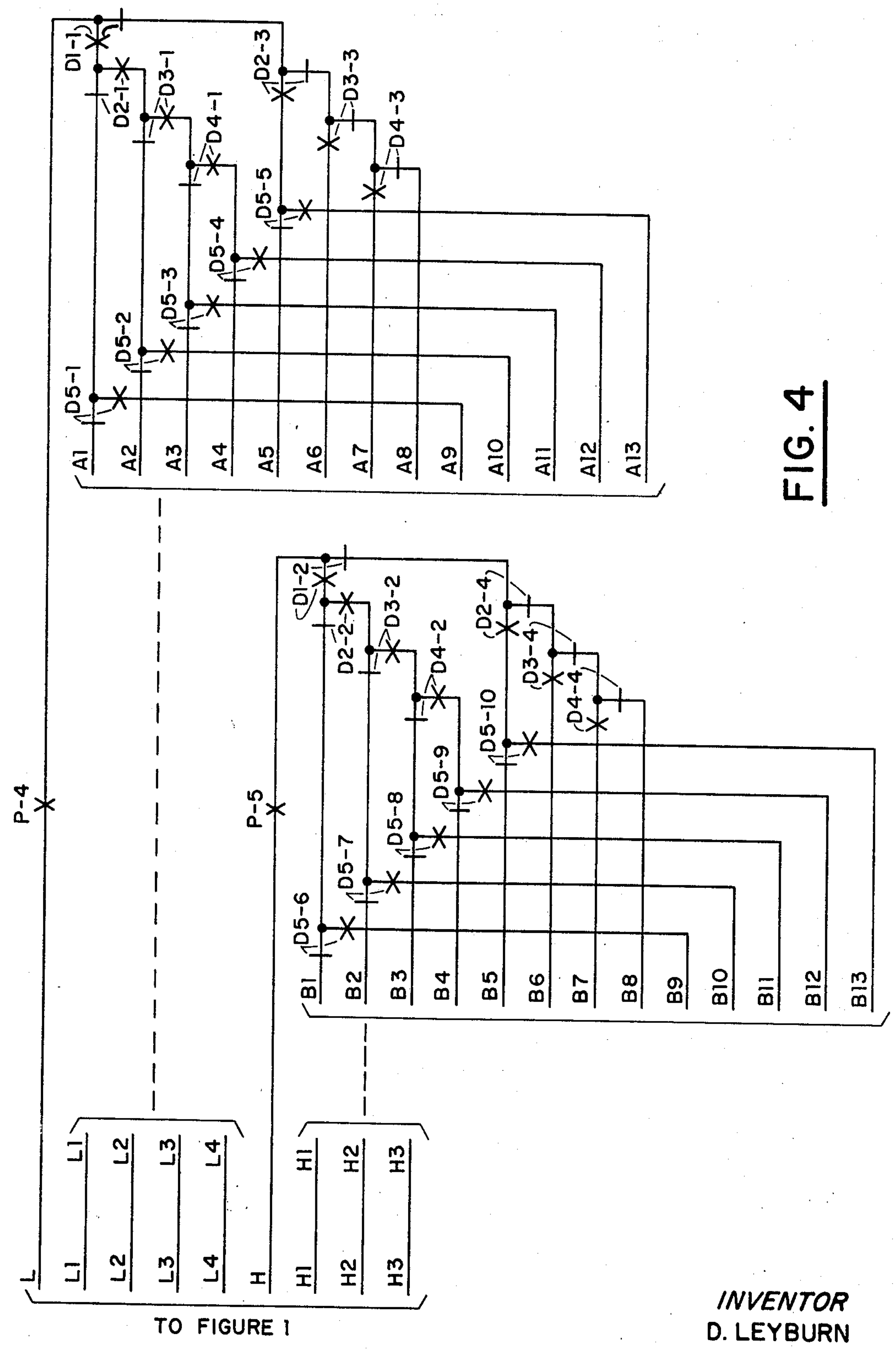
FIG. 4 illustrates the cross-connecting field which controls the transmission of the required tones for each digit of the called number.

If the first digit of the telephone number to be transmitted is digit "3," terminal A1 of the cross-connecting field illustrated in FIG. 4 is connected to terminal L1 and terminal B1 is connected to terminal H3. That way, when contacts P–4 and P–5 of relay P are closed, a pair of tones of 697 and 1477 c.p.s. are transmitted to the central office equipment (contacts D1–1 and D1–2 having been previously operated).

Relay P also operates contacts P–6 in FIG. 1 to energize relay PG through the circuit comprising potential source E6, relay PG, contacts P–6, operated contacts GS–3, contacts CT–3 and ground. The operation of relay PG opens contacts PG–1 and releases relay P. Relay PG locks operated through its own contacts PG–2 and released contacts DA–5 and DB–2.

The release of relay P applies a shunt to relay DA through now operated contacts DB–1. Relay DA is consequently released and causes the release of relay PG by operating contacts DA–5 in the holding path of relay PG. The release of relay PG reoperates relay P at contacts PG–1 and the cycle continues for generating the timing pulses required for the called number.

Relays DA and DB form a flip-flop circuit which controls the operation of the digit counting relays. Relay DA is operated as mentioned previously, when contacts A1–2 are closed upon seizure of the dial circuit. When relay P is operated, the shunt around relay DB is removed and relay DB is also operated. When relay P is released, a shunt is placed around relay DA through operated contacts DB–1 and relay DA is consequently released. When relay P is reoperated, relay DB is released. The following release of relay P will reoperate relay DA and the cycle will continue with the flip-flop circuit being operated and released (set and reset) on alternate release of relay P.

The release of relay DA releases contacts DA–4 and operates relay D2 of the digit counting relays through the circuit comprising potential source E3, relay D2, diode Z2, operated contacts D1–5, released contacts DA–4, operated contacts A1–3 and ground. Relay D1 remains operated through diode Z1A. Relay DA, in operating and releasing, causes the D1–D5 relays to count the outpulsed digits in the following sequence:

| Digit | Relays operated | | | | | |
|---|---|---|---|---|---|---|
| 1 | D1 | D1 | | | | |
| 2 | | D1 | D2 | | | |
| 3 | DA | D1 | D2 | D3 | | |
| 4 | | D1 | D2 | D3 | D4 | |
| 5 | DA | | D2 | D3 | D4 | |
| 6 | | | | D3 | D4 | |
| 7 | DA | | | | D4 | D5 |
| 8 | | | | | | D5 |
| 9 | DA | D1 | | | | D5 |
| 10 | | D1 | D2 | | | D5 |
| 11 | DA | D1 | D2 | D3 | | D5 |
| 12 | | D1 | D2 | D3 | D4 | D5 |
| 13 | DA | | D2 | D3 | D4 | D5 |

The operation of relay D1 and D2 in the cross-connecting field closes contacts D1–1 and D2–1 respectively to close a circuit from terminal L to terminal A2. In addition, it operates contacts D1–2 and D2–2 to close a circuit from terminal H to terminal B2. If terminals A2 and B2 are connected to terminal L2 and H3 respectively, for example, for the transmission of digit "6" as the second digit of the called number, such digit is transmitted to the distant office.

Returning now to FIG. 1, terminal CT is connected to one of terminals C7–C13 in accordance with the number of digits required. When the required number of digits has been outpulsed, relay CT is operated. Let us assume that the number of digits required is seven. After the last digit is outpulsed (digit number 7) relay D5 of the digit counting relays (see above table) is energized to tansmit digit number 8. However, relay CT is energized instead through the circuit comprising potential source E7, relay CT, terminal CT, terminal C7, released contacts D1–7, D2–7, D3–7, D4–7, operated contacts D5–12 and ground.

The operation of relay CT closes contacts CT–1 and CT–2 and connects the subscriber's loop or incoming trunk circuit to the central office equipment thus completing the talking connection. Relay CT locks over its own contacts CT–4 to the sleeve of the dial circuit. The operation of relay CT opens contacts CT–3 and releases relays A1, P and PG. The release of relay A1 releases relay GS at contacts A1–4 and all the operated digit counting relays D1–D5 at contacts A1–3.

If the dial circuit is used for two-way services in the central office, option A is used in FIG. 1 in place of option B. On incoming calls from the incoming trunk, relay A1 operates and contacts A1–5 converts option A into option B. On incoming calls from the central office equipment relay CT is operated through non-operated contacts A1–5 and contacts CT–1 and CT–2 connect the calling and called parties for ringing and talking purposes.

Relay CT is released at the end of the call when ground is removed from sleeve S1 or S2.

What is claimed is:

1. An automatic dial circuit comprising:
   (a) means responsive to seizure of the dial circuit for setting up the circuit for transmission of the first digit of the called number to a central office equipment;
   (b) a timing circuit;
   (c) digit counting relays for counting the digits required;
   (d) a flip-flop circuit responsive to the timing circuit for energizing the digit counting relays;
   (e) a tone generator for generating tone signals for each digit of the called number; and
   (f) circuit means including predetermined contacts of the digit counting relays for energizing the tone generator.

2. An automatic dial circuit as defined in claim 1 further comprising relay means responsive to said digit counting relays for completing the connection between the calling and called parties when the required number of digits have been dialed and for releasing the dial circuit.

3. An automatic dial circuit as defined in claim 1 wherein said means comprises means responsive to seizure of the dial circuit for signalling the central office equipment and means responsive to the connection of the central office equipment to the dial circuit for connecting the tone generator thereto.

4. An automatic dial circuit as defined in claim 1 wherein said flip-flop circuit comprises two relays which are operated and released on alternate ground pulses applied thereto by the timing circuit.

5. An automatic dial circuit as defined in claim 1 wherein said timing circuit is a two relay network, the first relay operating the second relay which releases the first relay which in turn causes the release of the second relay, the combination of the two relays producing the timing pulses for operating the flip-flop circuit.

6. An automatic dial circuit as defined in claim 1 wherein said tone generator generates a pair of tones for each digit to be transmitted and wherein said circuit means includes means connected to said tone generator for producing said pair of tones.

References Cited

UNITED STATES PATENTS 3,301,967 1/1967 Plyer ---------------- 179—84

KATHLEEN H. CLAFFY, Primary Examiner

T. J. AMICO, Assistant Examiner